J. B. DOW.
Pen for Weaning Calves.

No. 53,589.

Patented April 3, 1866.

---

UNITED STATES PATENT OFFICE.

J. B. DOW, OF DAVENPORT, IOWA.

IMPROVEMENT IN PENS FOR WEANING CALVES.

Specification forming part of Letters Patent No. 53,589, dated April 3, 1866.

*To all whom it may concern:*

Be it known that I, J. B. Dow, of Davenport, in the county of Scott and State of Iowa, have invented a new and useful Pen for Weaning Calves; and I do hereby declare that the following is a full, clear, and exact description thereof, reference being had to the accompanying drawings, making a part of this specification, in which—

Figure 1:
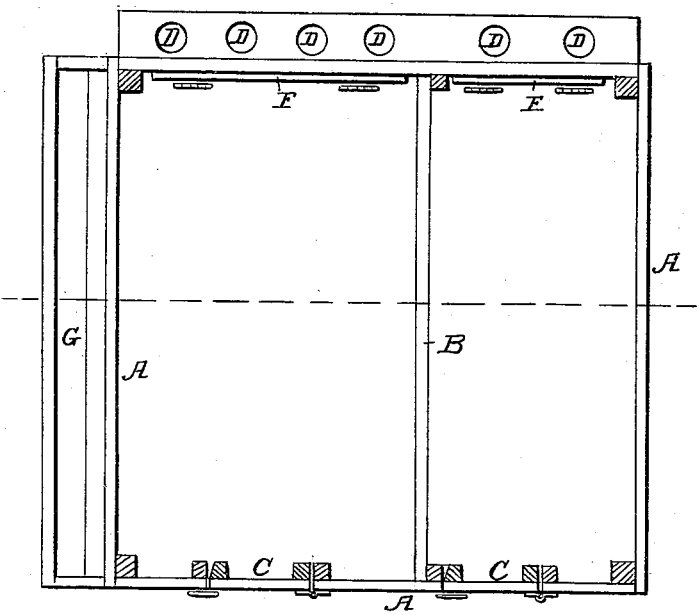
Figure 2:
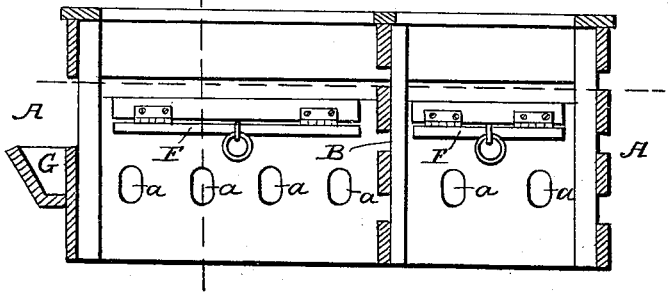
Figure 3:
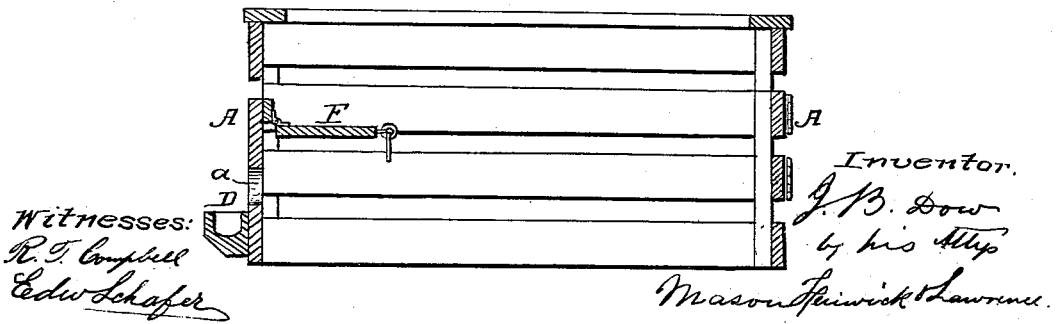

Figure 1 is a top view. Fig. 2 is a vertical section looking toward the feeding-troughs. Fig. 3 is a vertical section taken at right angles to Fig. 2.

Similar letters of reference indicate corresponding parts in the three figures.

The object of this invention is to wean calves from cows and to teach them to feed, first by confining them within a small inclosure provided with vessels on the outside of it for containing such food as young calves require; and, secondly, by combining with such inclosure a larger one for older calves, which latter inclosure is furnished with troughs for teaching the calves to stall feed, as well as vessels like those in the smaller pen.

The invention also provides for closing the openings through which the calves obtain their food, for the purpose of supplying the troughs with food before allowing the calves to eat. It also provides for separating the calves while eating, so that they shall not interfere with each other, as will be hereinafter described.

To enable others skilled in the art to understand my invention, I will describe its construction and operation.

In the accompanying drawings, A represents a rectangular pen, which is composed of horizontal rails secured to vertical posts, so as to leave spaces between them. The inclosure is separated by a partition, B, into two apartments—a large one and a small one. Both apartments have doors C C for ingress and egress, and both are provided with vessels or troughs, D D', for containing food.

The troughs are arranged on the outside of the pen for cleanliness, and also for convenience of access, and by thus arranging them provision can be made for preventing one calf from interfering with another while eating. This is done by securing a wide board to that side of the pen on which the troughs are arranged and making openings *a a a* through this board at suitable distances apart. The calves must put their heads through these openings to eat, and by doing so each calf eats and drinks its portion without molesting its neighbor.

On the inside of the pen doors F F are arranged, for the purpose of closing the holes *a a* when it is desired to supply the troughs with food. These doors are hinged above the openings *a a*, so that they can be raised or lowered at pleasure.

When the calves are sufficiently weaned from their mothers, and become old enough, they are moved to the large apartment of the pen, which, besides being supplied with feed-troughs D', is also provided with a long stall-trough, G. Here small openings, *a a*, and a door, F, are also provided, as shown. By this combination of a preparatory department and a graduating feed-department for calves there is no danger of the young calves which may have been weaned and taught to eat to some extent pining away and dying when removed into the graduating department, for in this department such imperfectly-weaned and imperfectly-taught calves have access to the milk-cups D through the holes *a a*.

It is not intended that the calves which are removed from the preparatory department to the graduating department shall be indulged in their desire for milk, but in order to save the weaker ones it is important to have the cellular trough D D' extend along both compartments, and to afford access thereto from both, as represented. The two apartments may, if desired, communicate by a door in the partition.

The pens may be constructed with a view of moving them from one place to another, so as to afford a dry bottom when one place becomes filthy, and the pens may be made sufficiently large to accommodate a great number of calves, as I intend them more particularly for large dairies where it is desirable to raise the calves.

Having thus described my invention, what I claim as new, and desire to secure by Letters Patent, is—

The calf-weaning and stall-feeding pen, constructed as herein described.

JOHN B. DOW.

Witnesses:
W. D. HARRAH,
C. H. ELDRIDGE.